Oct. 26, 1965
J. W. MARTIN ETAL
3,214,757
LINEAR AMPLIFIER SYSTEM
Filed June 7, 1961
3 Sheets-Sheet 1
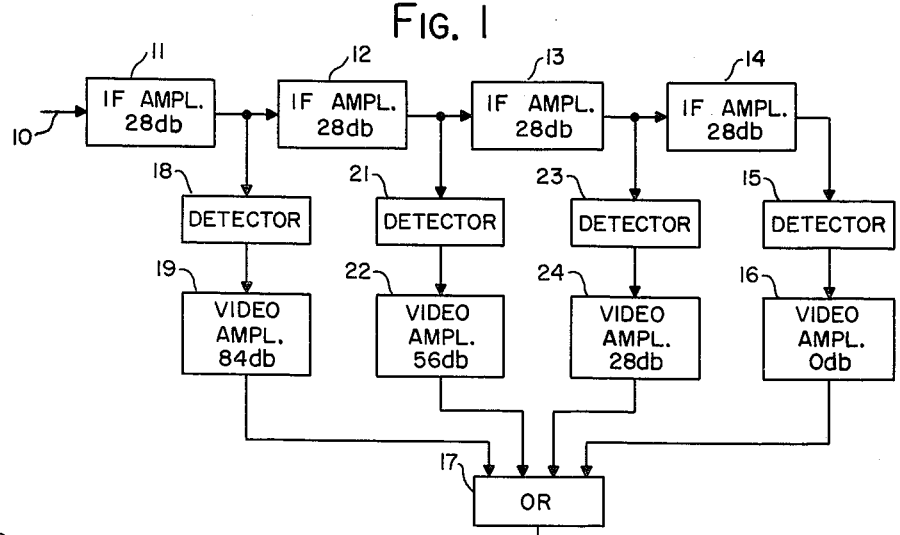
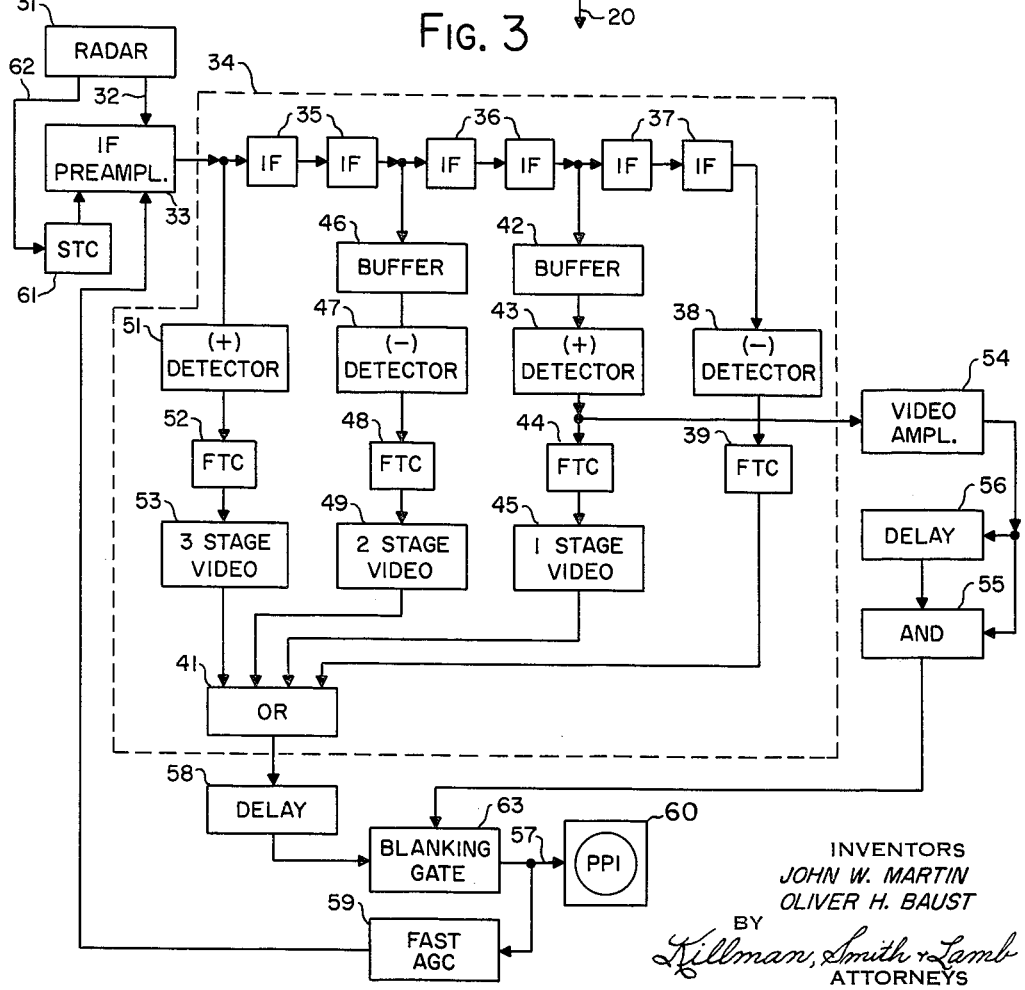
INVENTORS
JOHN W. MARTIN
OLIVER H. BAUST
BY
*Killman, Smith & Lamb*
ATTORNEYS

A. SIGNAL AFTER DETECTION FROM STAGE SATURATED ON CLUTTER

B. SIGNAL AFTER DETECTION FROM NON-SATURATED STAGE

C. AFTER FTC SATURATED STAGE

D. AFTER FTC NON-SATURATED STAGE

E. AFTER VIDEO AMPLIFICATION AND "OR" CIRCUITS

F. WITH BLANKING

INVENTORS
JOHN W. MARTIN
OLIVER H. BAUST
BY
Killman, Smith & Lamb
ATTORNEYS

Oct. 26, 1965   J. W. MARTIN ETAL   3,214,757
LINEAR AMPLIFIER SYSTEM
Filed June 7, 1961   3 Sheets-Sheet 3

INVENTORS
JOHN W. MARTIN
OLIVER H. BAUST
BY
Killman, Smith & Lamb
ATTORNEYS

3,214,757
LINEAR AMPLIFIER SYSTEM
John W. Martin, Lutherville-Timonium, and Oliver H. Baust, Baltimore, Md., assignors to The Bendix Corporation, Towson, Md., a corporation of Delaware
Filed June 7, 1961, Ser. No. 115,423
10 Claims. (Cl. 343—17.1)

This invention relates generally to wide dynamic range amplifier systems and the application of amplifiers of this type to provide improved radar systems.

Wide dynamic range amplifiers have been provided in the past which employ transmitting type tubes to supply the characteristics which cover the extreme range of output voltage involved in such devices. Such amplifiers have been relatively bulky and expensive due to the requirement for such tubes and have, accordingly, found limited application.

In radar receivers which are used with plan position indicators (PPI) a wide dynamic signal range is encountered due to the nature of the echoes obtained from clouds and surrounding terrain or water surfaces in comparison to the target echoes which it is desired to detect. The ground or sea return signals are generally designated "clutter" and in many instances the clutter signals obliterate many targets which should be detected if the radar system is to perform its function properly. In the absence of some special measures for the elimination of clutter, targets on the PPI may be either obliterated in a large block of clutter or obscured by being immersed in regions of high density localized clutter signals. One of the problems in improving the capability of radar systems is to provide "sub-clutter visibility" which may be defined as the ability to detect on the PPI a target echo which occurs in the portion of the screen which normally would display clutter.

Wide dynamic range linear-logarithmic amplifiers have been applied to radar receivers to suppress strong signals which produce clutter on the PPI indicator of the radar. The linear-logarithmic radar receiver suffers from loss of sensitivity due to the nature of its response characteristic so that target signals of relatively low amplitude occurring in the region where large amplitude clutter signals exists are suppressed. The elimination of clutter which arises from stationary objects can also be achieved using moving target indicator (MTI) techniques. Receivers of this type are complex and relatively expensive and require that precise timing circuits be maintained in proper operation for the elimination of targets from stationary objects.

Radar receivers of the aforementioned types, as well as receivers of the type known as the "Dicke fix" receiver, are all susceptible to certain types of jamming techniques and provide reduced sensitivity in the presence of jamming signals. None of them provides effective rejection of CW jamming.

It is an object of the present invention to provide an improved wide dynamic range linear amplifier system.

Another object of the invention is to provide a linear amplifier system having wide dynamic range which uses only conventional receiving type amplifier devices and components.

A further object of the invention is to provide an improved radar system incorporating the linear amplifier of the invention.

A still further object of the invention is to provide a radar system which has better sub-clutter visibility and improved immunity to all types of jamming signals than heretofore available.

These and other objects of the invention will be apparent from the following detailed description taken in conjunction with the accompanying drawings wherein:

FIG. 1 is a block diagram of a linear amplifier in accordance with the invention;

FIG. 3 is a block diagram of a radar system incorporating a modified linear amplifier;

Figure 2:
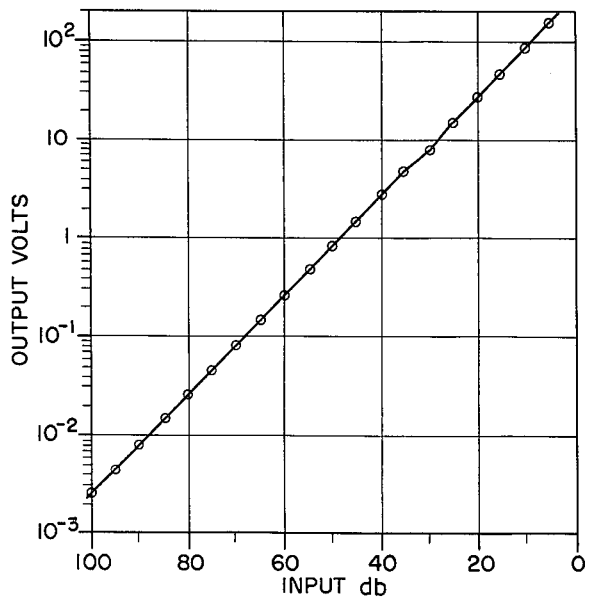
FIG. 2 is a characteristic showing the relation between input and output voltages of the amplifier of FIG. 1.

The amplifier in accordance with the present invention utilizes a plurality of intermediate frequency amplifier stages to amplify the lowest level signals for which the amplifier is designed. The output of the final IF stage is detected and supplied as the video output in a conventional manner. At a plurality of intermediate points on the IF amplifier cascade additional detectors are connected which drive video amplifiers which are connected through an OR gate to supply the same output device. The IF and video stages are so arranged that a signal passing through the amplifier by any path is subject to the same over-all amplification and the gains are distributed so that each preceding IF stage supplies suitable level signals to its detector when the succeeding stage starts to saturate. Thus the output of the OR circuit is the largest instantaneous signal present and small signals appear amplified with the same sensitivity irrespective of the existence of a large signal at the same time.

The amplifier of the invention is incorporated into a radar system by eliminating the D.C. component of clutter signals and limiting the response further to pulse signals which are not wider than the transmitting pulsewidths. This combination, together with a fast AGC circuit for the receiver, provides a radar which has improved sub-clutter visibility and immunity to jamming without a loss of sensitivity.

Referring now to FIG. 1, an amplifier for providing a linear dynamic range of 95 db is shown. Modulated IF signals are applied to the amplifier system from any suitable source 10 and amplified in a two-stage IF amplifier 11. The amplifier 11 is connected to supply the input signal to a two-stage IF amplifier 12 which in turn drives cascaded two-stage IF amplifiers 13 and 14. The output of the IF amplifier 14 is detected in a suitable semiconductor detector 15 and applied through a unity gain device 16 as one input to an OR 17.

The output signals from the amplifier 11 are also applied to a detector 18 which supplies the IF modulation signal as an input to a video amplifier 19. A similar detector 21 is connected between the IF amplifiers 12 and 13 to supply video signals to a video amplifier 22. The signal from the junction of IF amplifiers 13 and 14 is detected in a detector 23 which supplies video signals to a video amplifier 24. The outputs of the video amplifiers 19, 22 and 24 are connected as additional inputs to the OR 17.

As indicated in FIG. 1 each of the amplifiers 11, 12, 13 and 14 provides an IF gain of 28 db for a total IF gain of 112 db for signals supplied to detector 15. Since the video device 16 supplies a gain of 0 db signals which pass the detector 15 and device 16 to the OR gate 17 are amplified only in the IF stages. The gain provided by the IF amplifiers 11, 12, 13 and 14 is such that when the amplifier 14 begins to saturate, the signal applied to the detector 23 is high enough for efficient detection and modulation signals at this level and above receive video amplification of 28 db in the amplifier 24 prior to being applied to the OR gate 17. In similar manner when IF amplifier 13 saturates, the signals applied to the detector 21 are large enough for efficient detection and the detected signals receive 56 db of video amplification in the video amplifier 22 before being applied as an input to OR gate 17. Similarly when IF amplifier 12 saturates, signals above this level are detected by the detector 18, amplified 84 db in the amplifier 19 and applied as the final input to the OR gate 17. All of the inputs to the OR gate 17 are the same phase (i.e. not 180° out of phase).

The OR gate 17 instantaneously selects and passes the largest signal present at the OR gate inputs and hence provides at output 20 a linear replica of the input modulation on the IF signal applied to the amplifier 11 over an extremely wide dynamic range corresponding to the combined dynamic ranges of all the intermediate frequency stages with no single IF or video stage requiring a wide dynamic range. The range of operation of the circuit of FIG. 1 is shown in FIG. 2 for an input signal range of 95 db with the corresponding signal output voltage extending from 3 millivolts to over 160 volts.

In order to use the amplifier of the present invention in a radar system the arrangement of FIG. 3 is provided in which a conventional pulse radar 31 is arranged to provide on line 32 detected IF pulses corresponding to the energy returned to the radar antenna from surrounding objects. The IF pulses on line 32 are applied to an IF preamplifier 33 which supplies the input of a linear amplifier 34.

The linear amplifier 34 is generally similar to that described in connection with FIG. 1 and comprises six cascaded IF stages arranged as cascaded pairs 35, 36 and 37. The final output of the stages 37 is applied to a detector 38 which supplies video signals through a fast time constant circuit 39 to an OR 41. The IF signal at the junction of IF amplifiers 36 and 37 is passed through a unity gain buffer IF stage 42 to a detector 43, a fast time constant circuit 44 and then through a video amplifier 45. The output of the video amplifier 45 supplies an input of the OR gate 41. In similar manner the junction between IF amplifiers 35 and 36 is connected through a buffer IF amplifier 46, a detector 47, a fast time constant circuit 48 and a video amplifier 49 to another input to OR gate 41. The signal from the preamplifier 33 which is supplied to the input of IF amplifier 35 is also applied to a detector 51 which supplies video signals through a fast time constant circuit 52 to a video amplifier 53 which supplies the final input to OR gate 41. In each instance the gain of the IF pairs 35, 36 and 37 and the video amplifiers 45, 49 and 53 is such that a signal from the preamplifier 33 experiences the same total gain in reaching the input to OR 41 irrespective of the signal path followed. Since a different number of stages exists in the video amplifiers 45, 49 and 53 and in addition the buffer stages 42 and 46 are present where signals are derived from high impedance circuits, the polarity of the detectors 38, 43, 47 and 51 must be selected to provide the correct phase for the inputs to OR gate 41. All of the inputs to OR gate 41 should be the same phase and the arrangement of the polarity of the detectors shown provides this phase as will be apparent from the description of the schematic of this circuit hereinafter in connection with FIG. 4.

In order to eliminate large blocks of clutter signal such as result from large land masses the fast time constant circuits 39, 44, 48 and 52 have been introduced as shown. These FTC circuits differentiate the leading and trailing edges of the clutter signals and eliminate the intermediate portions therof.

In order to eliminate the leading edge pulse which remains after the operation of the FTC circuits a blanking circuit based on pulsewidth discrimination is employed. For this purpose the output of the detector 43 is applied to a video amplifier 54 which applies its output to both an AND gate 55 and a delay circuit 56. The delay circuit 56 delays the passage of signals by a time equal to the pulsewidth of pulses transmitted by the radar 31. Thus only pulses from the amplifier 54 which are wider than the transmitter pulsewidth will provide coincidence at the two inputs of AND gate 55 and hence produce an output to a blanking gate circuit 63. Whenever such an output is produced by AND gate 55 the blanking gate 63 produces a video blanking pulse on output line 57 to eliminate response on a PPI 60. In order to make this blanking pulse effective on the leading edge of the clutter pulse which it is to eliminate, all video signals supplied to the PPI 60 from OR gate 41 are delayed in a delay circuit 58 so that the total time delay for a signal through the amplifier 34, OR gate 41 and delay circuit 58 is equal to the delay through both amplifier 34 and 54 and the delay device 56. Thus, the operation of the circuit just described produces the blanking output from the blanking gate 63 just prior to the occurrence of a leading edge pulse from the output of the delay 58 whenever that pulse is derived from a clutter signal the duration of which is greater than the transmitter pulsewidth.

To further improve operation of the radar in the presence of input noise to the receiver and to enhance the anti-jamming capability where noise jamming is used, a fast AGC circuit 59 is provided to control the gain of the preamplifier 33. The gain of the preamplifier 33 is also controlled by a sensitivity time control circuit 61 which decreases the sensitivity of the receiver after each transmitted pulse in response to a trigger signal on line 62.

Figure 4:
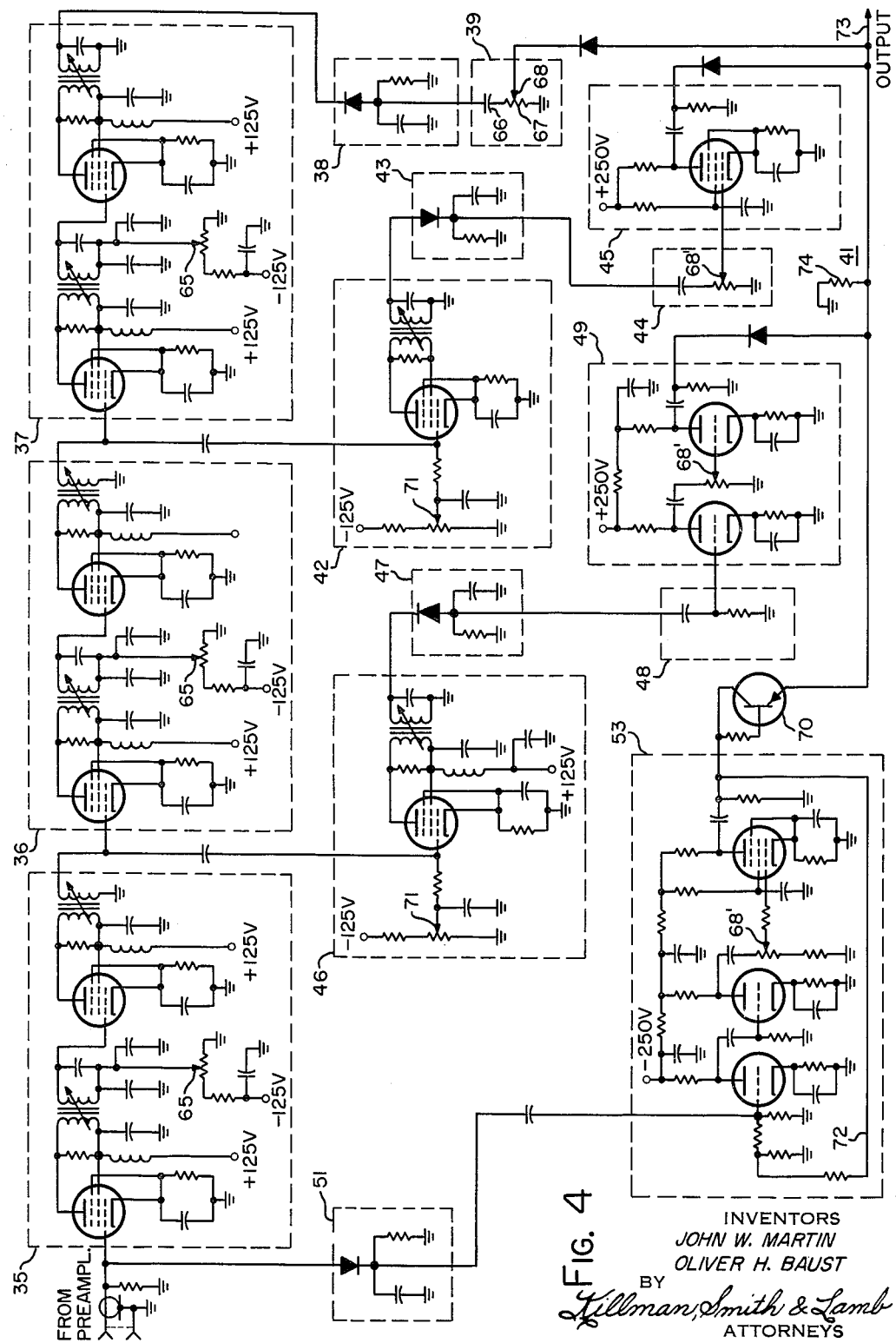
FIG. 4 is a schematic wiring diagram for the linear amplifier of FIG. 3.

Referring now to FIG. 4 a schematic wiring diagram for a vacuum tube amplifier version of the amplifier 34 of FIG. 3 will be described. The block units of FIG. 3 have been outlined in dashed lines in FIG. 4 and given the same reference numerals. Since the IF and video amplifiers employed are constructed in accordance with generally accepted practice, no detailed description of the circuit will be made but those aspects of the circuit peculiar to applicants' novel amplifier system will be emphasized.

The IF amplifiers 35, 36 and 37 are seen in FIG. 4 to comprise two stages of amplification each employing a pentode type tube. The gain of each of these amplifiers is adjustable by means of potentiometers 65 which control the negative grid bias on the second stage of each IF amplifier. The output of the IF amplifier 37 is detected by the detector circuit 38 comprising a diode and RC circuit. The fast time constant (FTC) circuit 39 comprises a series capacitor 66 and potentiometer 67 proportioned to provide a time constant of approximately 1.5 microseconds. The video gain is adjustable by selectively positioning a tap 68 on the potentiometer 67.

The output of the amplifier 36 which supplies the input to the amplifier 37 is also applied to the input of the buffer IF amplifier 42. The amplifier 42 is a single pentode stage which has negative grid bias adjustable by means of a potentiometer 71 to permit the over-all gain through the amplifier stage 42 to be adjusted to unity. The output of the buffer 42 is detected by the detector 43 and after passing through the FTC circuit 44 is amplified in a single pentode stage video amplifier 45. Since the single stage in the amplifier 45 produces phase inversion the diode in the detector 43 is connected with opposite polarity compared with the diode in detector 38.

The output of the IF amplifier 35 is applied to the buffer 46 which has adjustment 71 for obtaining unity gain. The video amplifier 49 which amplifies the detected signal from the buffer 46 is a two-stage triode amplifier, the output of which is in phase relative to the output of the detector 47. Hence, the diode in detector 47 is connected with the same polarity as the diode in detector 38.

The input to the IF amplifier 35 is obtained from a preamplifier having a relatively low output impedance and hence this signal can be applied without buffering to the detector 51. To provide sufficient video gain for the signal detected by the detector 51 the video amplifier 53 has three stages and includes an over-all negative feedback connection 72. The polarity in the diode of detector 51 is thus the same as that in the detector 43.

In each of the video amplifiers 45, 49 and 53 a potentiometer adjustment 68' is provided to control the overall video gain. Thus the signal amplitude after detection is adjustable to all four of the inputs to the OR circuit 41.

The OR circuit 41 consists of like polarity diodes connected from each video output to an output line 73 with a resistor 74 connected from the line 73 to ground. The diode connected to the output of the video amplifier 53 is a PNP transistor 70 having a 10,000 ohm resistor connected between collector and base. The OR input is connected to the collector and the output connected to the emitter. This configuration provides a much lower forward impedance (approximately 1 ohm) than is obtainable from conventional semi-conductor diodes, although a conventional diode would be satisfactory.

In the operation of the amplifier system of FIG. 4 the IF gains in amplifiers 35, 36 and 37 are first adjusted by means of potentiometers 65 to be the same. The buffer amplifiers 42 and 46 are adjusted for unity gain by means of the bias controls 71. A video output level on line 73 is selected by means of adjusting tap 68 on the potentiometer 67 to obtain the desired video level for the lowest level input signals to be amplified. The gains of the video amplifiers 45, 49 and 53 are then adjusted by the controls 68' individual to each of these amplifiers to provide the video gain required in each channel. Thus the video amplifier 45 will be adjusted to have the same gain as the IF amplifier 37, while video amplifier 49 will be adjusted to have the same gain as the total gain provided by IF amplifiers 36 and 37. The video amplifier 53 will be adjusted by means of control 68' to provide the same gain as the over-all IF gain through amplifiers 35, 36 and 37.

Figure 5:
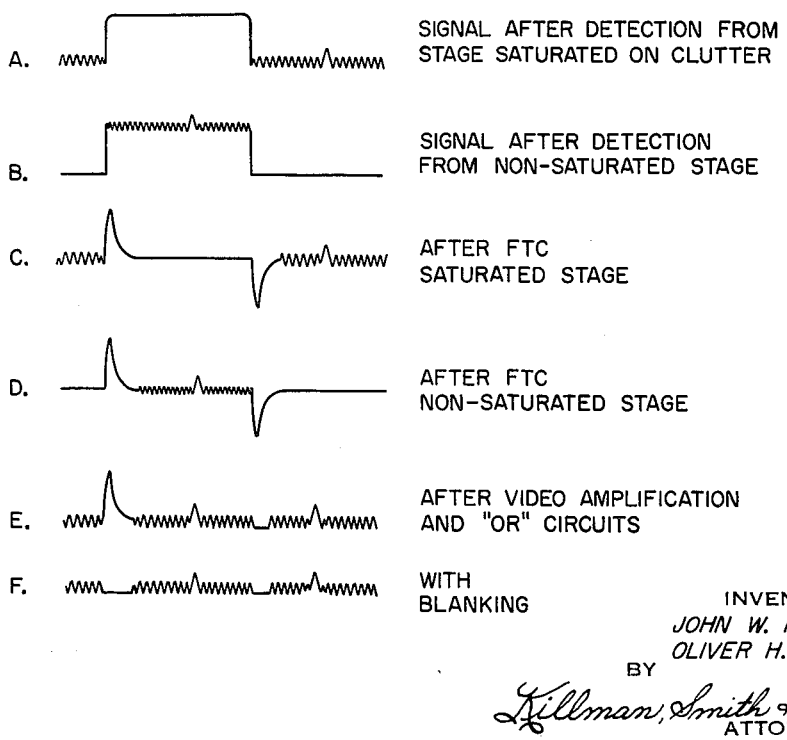
FIG. 5 is a waveform diagram showing the operation of the radar of FIG. 3.

Referring now to FIG. 5 a description of the waveform diagrams showing the operation of the radar system of FIG. 3 will be given. In FIG. 5 waveform A is the signal that would exist if the detected signal is derived from a stage this is saturated by a large block of clutter which obliterates a target signal occurring therein. Waveform B shows the signal from a non-saturated stage in which a target appears riding on top of the clutter signal and low level signals are not detected. The operation of the FTC circuit to differentiate long blocks of clutter produces signals such as shown in waveforms C and D from saturated and non-saturated stages respectively. Waveform E shows the output of the OR circuit which acts to combine the waveforms C and D to show both targets and eliminates the negative portion of the waveform produced by the FTC circuit. The leading edge of the differentiated pulse produced by the FTC circuit eliminated by the blanking circuit described in FIG. 3 produces the final waveform F which, when applied to the PPI, will give an indication of both targets without interference from the clutter signal.

While a particular amplifier system having wide dynamic range and the application of such an amplifier to provide an improved radar system have been disclosed, it will be apparent that many modifications may be made in the details by which the invention is implemented without departing from the spirit of the invention. The transistorized version of the circuits of the invention will also be apparent to those skilled in the art. The invention, accordingly, is to be limited only by the scope of the appended claims.

We claim:

1. A wide band large dynamic range amplifier comprising a plurality of cascaded tuned amplifier stages, a detector coupled to the output of the final stage, a plurality of detectors coupled respectively to successive stages ahead of said final stage, video circuit means coupled to the output of each said detector, each of said video circuit means having a gain substantially equal to the total gain of said tuned amplifier stages beyond the point in said cascade at which the respective detector feeding said video circuit means is coupled, and means for combining the outputs of all of said video circuit means to provide wide dynamic range output signals.

2. An amplifier system comprising a plurality of cascaded tuned amplifier stages, a final detector coupled to the output of the final stage, the over-all gain of said plurality of stages being sufficient to amplify the lowest level signals to be utilized by said system to a threshold level to which said detector efficiently responds, an intermediate detector coupled to a point of intermediate gain on said cascaded stages, said point being determined as having sufficient gain to produce signal at said threshold level when said final stage saturates, and means including a video amplifier for signals detected by said intermediate detector for combining signals from said detectors to provide a linear dynamic range corresponding to the combined dynamic range of the stages driving said detectors.

3. An amplifier system comprising a plurality of cascaded tuned amplifier stages, a detector coupled to the output of the final stage, the overall gain of said plurality of stages being sufficient to amplify the lowest level signals to be utilized by said system to a threshold level to which said detector efficiently responds, a plurality of additional detectors coupled to intermediate points on said cascaded stages, said points being located at successively lower gains progressing from the final stage of said plurality towards the first stage of said plurality to provide a signal at the level of said threshold for one of said additional detectors while said final stage and stages between the point of connection of said one detector and said final stage saturate, and means including video amplification for combining the outputs of all of said detectors to provide a linear dynamic range corresponding to the combined dynamic range of the stages driving said detectors.

4. An amplifier system comprising a plurality of cascaded tuned amplifier stages to provide gain progressively increasing from the first stage to the final stage, a final detector coupled to the output of the final stage, the over-all gain of said plurality of stages being sufficient to amplify the lowest level signals to be utilized by said system to a threshold level to which said detector efficiently responds, an intermediate detector coupled to an intermediate point on said cascaded stages, said point being determined as having sufficient gain to amplify a signal larger than said lowest level signal to said threshold level, said larger signal causing saturation of said final stage, a video amplifier coupled to the output of said intermediate detector, said video amplifier having a gain equal to the total gain of the tuned amplifier stages beyond the point in said cascade to which said intermediate detector is coupled, and means for combining the outputs of said final detector and said video amplifier to provide a wide linear dynamic range.

5. Apparatus according to claim 4 in which said combining means consists of an "OR" gate connecting said outputs.

6. A linear amplifier comprising a plurality of cascaded tuned amplifier stages providing gain progressively increasing from the first stage to the final stage, a final detector coupled to said final stage, the over-all gain of said cascaded amplifiers being sufficient to amplify the lowest level signals to be utilized by said system to a threshold level to which said detector efficiently responds, a plurality of intermediate detectors connected separately to outputs of said cascaded amplifiers to receive signals of progressively greater amplification, the signal applied to said intermediate detector connected nearest to the first stage of said cascade being the least amplified, amplifying means connected to the output of each of said intermediate detectors, said amplifying means having progressively diminishing gain with the one of said amplifying means connected to said detector nearest said first stage having the greatest gain, the combined gain measured from the first stage of said cascade to the output of each of said amplifying means being equal to the overall gain of said cascade, and means for combining the outputs of said final detector and said amplifying means.

7. Apparatus according to claim 6 in which said combining means is an "OR" circuit.

8. A pulse radar system comprising a radar providing transmitted pulses and received echo pulses converted to intermediate frequency signals, an intermediate frequency amplifier having a plurality of amplifying stages connected in cascade, a final video detector connected to the output of the final stage of said intermediate frequency amplifier, a plurality of additional detectors each connected to the output of a successive stage in said cascade, a plurality of video amplifiers each receiving the output of one of said additional detectors to provide a plurality of parallel amplifying channels depending from the cascade of said intermediate frequency amplifier, the gain of each of said amplifying channels being successively reduced in accordance with the number of stages of said intermediate frequency amplifier separating that channel from the input to said intermediate frequency amplifier, the gain of each channel also being of such value that the gains measured from the input of said intermediate frequency amplifier to the outputs of each amplifying channel are each equal to the over-all gain of said intermediate frequency amplifier, means for combining the output of said final detector and the outputs of each of said amplifying channels, and a plan position indicator for displaying the output of said combining means.

9. A radar system according to claim 8 and including means for generating a blanking pulse for received signals longer than the pulse width of transmitted pulses, and means for applying said blanking pulses to blank the display on said indicator of the leading edge of said longer signals.

10. A radar system according to claim 9 in which the blanking pulse generating and applying means comprises a coincidence circuit, delay means for delaying signals for a time interval equal to the pulsewidth of transmitted pulses, means for coupling detected signals through said delay means as one input to said coincidence circuit, means for coupling said detected signals without delay to the other input of said coincidence circuit, means for delaying the output of said output circuit prior to display on said indicator, and means responsive to a coincidence output from said coincidence circuit for applying a blanking pulse to said indicator to eliminate the display of the leading edge of pulses longer than said pulsewidth.

References Cited by the Examiner

UNITED STATES PATENTS

| 2,994,079 | 7/61 | Obloy et al. | 343—5 |
| 3,029,429 | 4/62 | Rodgers | 343—16 |

KATHLEEN H. CLAFFY, *Primary Examiner.*

CHESTER L. JUSTUS, *Examiner.*